United States Patent [19]
Emert et al.

[11] Patent Number: 5,872,084
[45] Date of Patent: Feb. 16, 1999

[54] DISPERSANTS DERIVED FROM HEAVY POLYAMINE AND SECOND AMINE

[75] Inventors: Jacob I. Emert, Brooklyn, N.Y.; Joseph V. Cusumano, Watchung, N.J.; David C. Dankworth, Whitehouse Station, N.J.; William D. Diana, Belle Mead, N.J.; William B. Eckstrom, Fanwood, N.J.; Keith R. Gorda, Little York, N.J.; Antonio Gutierrez, Mercerville, N.J.; Jon E. Stanat, Westfield, N.J.; Warren A. Thaler, Flemington, N.J.; Stephen Zushma, Clinton, N.J.

[73] Assignee: Exxon Chemical Patents, Inc., Linden, N.J.

[21] Appl. No.: 7,477

[22] Filed: Jan. 15, 1998

Related U.S. Application Data

[60] Division of Ser. No. 441,030, May 25, 1995, Pat. No. 5,756,431, which is a continuation-in-part of Ser. No. 261,554, Jun. 17, 1994.

[51] Int. Cl.⁶ .................................................. C10M 133/56
[52] U.S. Cl. ........................... 508/293; 508/454; 508/554
[58] Field of Search ..................................... 508/293, 454, 508/554

[56] References Cited

U.S. PATENT DOCUMENTS

| | | | |
|---|---|---|---|
| 3,172,892 | 3/1965 | LeSuer et al. | 260/326.5 |
| 3,711,406 | 1/1973 | Lowe | 252/33.4 |
| 4,088,588 | 5/1978 | Pecoraro | 252/51.5 A |
| 4,098,585 | 7/1978 | Vartanian et al. | 44/63 |
| 4,108,945 | 8/1978 | Fetters et al. | 260/880 B |
| 4,152,499 | 5/1979 | Boerzel et al. | 526/52.4 |
| 4,219,432 | 8/1980 | Girgenti et al. | 252/51.5 A |
| 4,234,435 | 11/1980 | Meinhardt et al. | 252/51.5 A |
| 4,471,091 | 9/1984 | Hayashi | 525/71 |
| 4,735,736 | 4/1988 | Chung | 252/48.6 |
| 4,840,744 | 6/1989 | Wollenberg et al. | 252/51.5 A |
| 4,927,551 | 5/1990 | Erdman et al. | 252/42.7 |
| 4,938,881 | 7/1990 | Ripple et al. | 252/32.7 E |
| 4,952,739 | 8/1990 | Chen | 585/18 |
| 5,049,294 | 9/1991 | Van Zon el al. | 252/51.5 A |
| 5,053,152 | 10/1991 | Steckel | 252/51.5 R |
| 5,070,131 | 12/1991 | Rhodes et al. | 524/484 |
| 5,114,435 | 5/1992 | Abramo et al. | 44/384 |
| 5,137,980 | 8/1992 | DeGonia et al. | 525/327.6 |
| 5,160,648 | 11/1992 | Steckel | 252/47.5 |
| 5,164,101 | 11/1992 | Brownawell et al. | 252/25 |
| 5,171,466 | 12/1992 | Korosec | 252/51.5 A |
| 5,230,714 | 7/1993 | Steckel | 44/432 |
| 5,232,616 | 8/1993 | Harrison et al. | 252/51.5 A |
| 5,241,003 | 8/1993 | Degonia et al. | 525/123 |
| 5,334,321 | 8/1994 | Harrison et al. | 252/51.5 A |
| 5,356,552 | 10/1994 | Harrison et al. | 252/51.5 A |
| 5,756,431 | 5/1998 | Emert et al. | 508/293 |

FOREIGN PATENT DOCUMENTS

| | | |
|---|---|---|
| 0475609 | 3/1992 | European Pat. Off. . |
| 0556915 | 8/1993 | European Pat. Off. . |
| 0565285 | 10/1993 | European Pat. Off. . |
| 9003359 | 9/1989 | WIPO . |

*Primary Examiner*—Jerry D. Johnson
*Attorney, Agent, or Firm*—Ohlandt, Greeley, Ruggiero & Perle

[57] ABSTRACT

A Koch functionalized product, which is the reaction product of at least one hydrocarbon with carbon monoxide and a nucleophilic trapping agent, is derivatized with a heavy polyamine and a second amine. The hydrocarbon is a hydrocarbon compound or a hydrocarbon polymer. A heavy polyamine is a mixture of polyamines containing small amounts of lower polyamine oligomers such as tetraethylene pentamine and pentaethylenehexamine and containing primarily oligomers with more than 6 nitrogens and more extensive branching. Rubber seals embrittlement is reduced or minimized.

2 Claims, No Drawings

DISPERSANTS DERIVED FROM HEAVY POLYAMINE AND SECOND AMINE

CROSS-REFERENCE

This is a divisional of application Ser. No. 08/441,030, filed May 25, 1995, now U.S. Pat. No. 5,756,431, which application is a continuation-in-part of U.S. Ser. No. 08/261,554, "Lubricating Oils Dispersants Derived from Heavy Polyamines", filed Jun. 17, 1994. This application is related to U.S. Ser. No. 441,029, entitled, "Process For Preparing Polymeric Amines Useful as Additives in Fuels and Lubricating Oils", filed May 25, 1995, which is also a continuation-in-part of U.S. Ser. No. 261,554, and which is hereby incorporated by reference in its entirety for all purposes. This application is also related to U.S. Ser. No. 261,507, "Amidation of Ester Functionalized Polymers; U.S. Ser. No. 261,559, Batch Koch Carbonylation Process"; U.S. Ser. No. 261,534, "Derivatives of Polyamines With One Primary Amine and Secondary or Tertiary Amines"; U.S. Ser. No. 261,560, "Continuous Process for Production of Functionalized Olefins"; U.S. Ser. No. 261,557, "Pre-stripped Polymer Used to Improve Koch Reaction"; and U.S. Ser. No. 261,558, Functionalized Additives Useful In Two-Cycle Engines", all filed Jun. 17, 1994, all of which contain related subject matter as indicated by their titles and are hereby incorporated by reference in their entirety for all purposes.

FIELD OF THE INVENTION

The invention relates to dispersant additives comprising hydrocarbyl amides, including polymeric amides prepared from functionalized hydrocarbon polymers reacted (e.g. derivatized) with heavy polyamines and non-polymeric amides prepared from functionalized hydrocarbon compounds reacted with heavy polyamines. "Heavy polyamine" as referred to herein is a mixture of higher oligomers of amines containing essentially no pentamine, small amounts of hexamines, but primarily oligomers with more than 6 nitrogens, and more branching. Use of heavy polyamine allows for incorporation of greater amounts of nitrogen into the dispersant molecule than prior art amines. The hydrocarbyl amide dispersants disclosed herein are useful as additives in fuel and lubrication oils.

The term "hydrocarbon" is used herein to refer to both polymeric and non-polymeric compositions comprising hydrogen and carbon. Polymeric compositions comprise relatively large molecules built up by the repetition of many small, simple chemical units. Hydrocarbon polymers contain units which are predominantly formed of hydrogen and carbon. When only several such units are linked, the resulting composition is sometimes referred to as an oligomer. Nonpolymeric compositions are typically compounds which have uniform properties such as molecular weight, whereas polymers are defined by average properties; for example, number average molecular weight ($\overline{M}_n$) although this term can be applied to both polymeric and non-polymeric compositions. As used herein, the term hydrocarbon includes mixtures of such compounds which individually are characterized by uniform properties.

There is no "bright line" in the art distinguishing oligomers from low molecular weight polymers. Nor is there always a clear distinction between oligomers and compounds or even polymers and compounds. As used herein, however, the term "hydrocarbon polymer" refers to hydrocarbon compositions with $\overline{M}_n$ of at least about 500, and the term "hydrocarbon compound" refers to hydrocarbon compositions (including oligomers) with $\overline{M}_n$ less than about 500.

Hydrocarbons have been reacted to form carboxyl group-containing compositions and their derivatives. Carboxyl groups have the general formula —CO—OR, where R can be H, a hydrocarbyl group, or a substituted hydrocarbyl group. The equivalent thiocarboxylic groups may also be used.

BACKGROUND OF THE INVENTION

U.S. Ser. No. 992,403 filed Dec. 17, 1992, discloses amidation (derivatization) of polymers functionalized by the Koch reaction with amine and is incorporated by reference herein in its entirety for all purposes.

Polyalkenyl succinimides are a widely used class of dispersants for lubricant and fuels applications. They are prepared by the reaction of, for example, polyisobutylene with maleic anhydride to form polyisobutenyl-succinic anhydride, and then a subsequent condensation reaction with ethylene amines.

EP-A1-475609 discloses the use of "heavy polyamine" which is disclosed to be a mixture of polyethyleneamines sold by Union Carbide Co. under the designation Polyamine HPA-X.

U.S. Pat. No. 5,230,714 discloses the use of "polyamine bottoms" derived from an alkylene polyamine mixture. "Polyamine bottoms" are characterized as having less than two, usually less than 1% by wt. of material boiling below about 200° C. In the case of ethylene polyamine bottoms, the bottoms were disclosed to contain less than abut 2% by wt. total diethylene triamine (DETA) or triethylene tetraamine (TETA). A typical sample of such ethylene polyamine from Dow Chemical Company, designated as "E-100" was disclosed to have a percent nitrogen by weight of 33.15 and gas chromatography analysis showed it to contain about 0.93% "Light Ends" (DETA), 0.72% TETA, 21.74% tetraethylene pentamine and 76.61% pentaethylene hexamine and higher (by weight).

U.S. Pat. No. 4,938,881 similarly discloses the use of "polyamine bottoms".

U.S. Pat. No. 5,164,101 discloses the polybutenylsuccinimide of polyamines, wherein the polyamine has a specific formula.

U.S. Pat. No. 5,114,435 discloses a polyalkylenesuccinimide prepared from a polyalkylenesuccinic acid or anhydride reacted with a polyalkylene polyamine of a specific formula. Hexaethylene heptamine is disclosed to be a suitable amine.

U.S. Pat. No. 4,927,551 discloses a polybutenyl succinic anhydride reacted with Dow E-100 heavy polyamine (weight average molecular weight ("$\overline{M}_w$")=303, available from Dow Chemical Company).

U.S. Pat. No. 5,241,003 discloses succinimides derived from amines of a specific formula. Various suitable low cost polyethylene polyamine mixtures are disclosed to be available under various trade designations such as "Polyamine H", "Polyamine 400", "Dow Polyamine E-100" and "Dow S-1107".

SUMMARY OF THE INVENTION

The present invention is an amide-containing product of a functionalized hydrocarbon having functional groups of the formula —CO—Y—R$^3$ wherein Y is O or S, and R$^3$ is H, hydrocarbyl, or substituted hydrocarbyl, reacted (derivatized) with a heavy polyamine. The present invention is also an amide-containing product of a functionalized hydrocarbon having functional groups of the formula —CO—Y—R$^3$ wherein Y is O or S, and R$^3$ is H, hydrocarbyl or substituted hydrocarbyl reacted (derivatized) with a heavy polyamine and a second amine.

The present invention is also a process for producing an amide-containing product which comprises the step of derivatizing a functionalized hydrocarbon having functional groups of the formula —CO—Y—R$^3$, wherein Y is O or S, and R$^3$ is H, hydrocarbyl, or substituted hydrocarbyl, with a heavy polyamine or with a heavy polyamine and a second amine in an amount and under conditions effective to form a derivatized product in which a major portion of the functional groups are converted to amide groups.

In a preferred embodiment of the process of the invention, the process further comprises the step of preparing the functionalized hydrocarbon by reacting in the presence of at least one acid catalyst having a Hammett acidity of less than −7, at least one hydrocarbon having at least one carbon-carbon double bond, carbon monoxide, and a nucleophilic trapping agent selected from the group consisting of water, hydroxy-containing compounds and thiol-containing compounds, the reaction being conducted in the absence of reliance on transition metal as catalyst; optionally wherein the nucleophilic trapping agent has a pKa of less than 12.

The present invention is also a dispersant produced by derivatizing functionalized hydrocarbon with a heavy polyamine or with a heavy polyamine and a second amine. The present invention is also a functionalized hydrocarbon which is derivatized by reacting with a heavy polyamine to contain at least one —CO— heavy polyamine group (i.e., at least one heavy amide group).

Preferred embodiments of the invention include:

The hydrocarbon as above wherein said hydrocarbon comprises hydrocarbon polymer; the hydrocarbon as above wherein said hydrocarbon comprises hydrocarbon compound; the functionalized hydrocarbon as above wherein said functionalized hydrocarbon has an average of up to two functional groups; the functionalized hydrocarbon as above wherein at least 50 mole % of the functional groups are attached to a tertiary carbon atoms (i.e., at least 50 mole % of the functional groups are neo); the functionalized hydrocarbon as above wherein said functionalized hydrocarbon is derived from hydrocarbon polymer, preferably an ethylene/alpha-olefin copolymer; an oleaginous composition in the form of a lubricating oil or lubricating oil additive package comprising the derivatized hydrocarbon as above and a base oil; the amide-containing product (i.e., derivatized, functionalized hydrocarbon) as above wherein said heavy polyamine comprises an equivalent weight of about 120–160 grams per equivalent of primary amine and at least about 28 wt. % nitrogen; the amide-containing product as above wherein said polyamine has an average of at least about 7 nitrogens per molecule and an equivalent weight of about 125–140 grams per equivalent of primary amine; the amide-containing product as above wherein said heavy polyamine comprises less than about 1 wt. % pentamines and lower polyamines and less than about 25 wt. % hexamines; the amide-containing product as above wherein said heavy polyamine comprises substantially no oxygen; and the use of the amide-containing product as above in a 2-cycle engine oil.

The present invention relates to dispersant additives comprising hydrocarbyl amides prepared from functionalized hydrocarbon polymers or functionalized hydrocarbon compounds reacted (e.g. derivatized) with "heavy polyamines". "Heavy polyamine" as referred to herein is a mixture of higher oligomers of amines, especially alkylene amines, containing essentially no pentamines, small amounts of hexamines, but primarily oligomers with more than 6 nitrogens, and more branching. The hydrocarbyl amide dispersants disclosed herein are useful as additives in fuel and lubricating oils. The hydrocarbons (i.e., hydrocarbon polymers or hydrocarbon compounds) are functionalized using the Koch reaction and derivatized using a "heavy polyamine".

The invention includes functionalized hydrocarbon which comprises a hydrocarbon compound of less than about 500 $\overline{M}_n$ functionalized to contain at least one functional group of the formula —CO—Y—R$^3$ wherein Y is O or S; R$^3$ is aryl or substituted hydrocarbyl, preferably aryl or substituted aryl; and —Y—R$^3$ is derived from H—Y—R$^3$ which has a pKa of 12 or less; and, optionally, wherein at least 50 mole % of the functional groups are attached to a tertiary carbon atom (i.e., at least 50 mole % of the functional groups are neo); and a process for producing such functionalization hydrocarbon.

Also disclosed are derivatized hydrocarbon dispersants which are the product of reacting (1) a hydrocarbon comprising a hydrocarbon compound of less than about 500 $\overline{M}_n$ functionalized to contain at least one functional group of the formula —CO—Y—R$^3$, wherein Y is O or S; R$^3$ is H, hydrocarbyl or substituted hydrocarbyl, preferably aryl or substituted aryl, and, optionally, wherein at least 50 mole % of the functional groups are attached to a tertiary carbon atom; and (2) a nucleophilic reactant; wherein at least about 80% of the functional groups originally present in the functionalized hydrocarbon are derivatized.

The heavy polyamine as the term is used herein contains more than six nitrogens per molecule, but preferably polyamine oligomers containing seven or more nitrogens per molecule and with two or more primary amines per molecule. The heavy polyamine comprises more than 28 wt. % (e.g. >32 wt. %) total nitrogen and an equivalent weight of primary amine groups of 120–160 grams per equivalent. Commercial dispersants are based on the reaction of carboxylic acid moieties with a polyamine such as tetraethylenepentamine (TEPA) with five nitrogens per molecule. Commercial TEPA is a distillation cut and contains oligomers with three and four nitrogens as well. Other commercial polyamines known generically as PAM, contain a mixture of ethylene amines where TEPA and pentaethylene hexamine (PEHA) are the major part of the polyamine. Typical PAM is commercially available from suppliers such as the Dow Chemical Company under the trade name E-100 or from the Union Carbide Company as HPA-X. This mixture typically consists of less than 1.0 wt. % low molecular weight amine, 10–15 wt. % TEPA, 40–50 wt. % PEHA and the balance hexaethylene heptamine (HEHA) and higher oligomers. Typically PAM has 8.7–8.9 milliequivalents of primary amine per gram (an equivalent weight of 115–112 grams per equivalent of primary amine) and a total nitrogen content of about 33–34 wt. %.

It has been discovered that heavier cuts of PAM oligomers with practically no TEPA and only very small amounts of PEHA but containing primarily oligomers with more than 6 nitrogens and more extensive branching produce dispersants with improved dispersancy when compared to products derived from regular commercial PAM under similar conditions with the same hydrocarbon or polymer backbones. An example of one of these heavy polyamine compositions is commercially available from the Dow Chemical Company under the trade name of Polyamine HA-2.

HA-2 is prepared by distilling out all the lower boiling ethylene amine oligomers (light ends) including TEPA. The TEPA content is less than 1 wt. %. Only a small amount of PEHA, less than 25 wt. %, usually 5–15 wt. %, remains in the mixture. The balance is higher nitrogen content oligomers with a greater degree of branching. The heavy polyamine preferably comprises essentially no oxygen.

Typical analysis of HA-2 gives primary nitrogen values of 7.8 milliequivalents (meq) (e.g. 7.7–7.8) of primary amine per gram of polyamine. This calculates to be about an equivalent weight (EW) of 128 grams per equivalent (g/eq). The total nitrogen content is about 32.0–33.0 wt. %. Commercial PAM analyzes for 8.7–8.9 meq of primary amine per gram of PAM and a nitrogen content of about 33–34 wt. %.

The present invention uses "heavy" polyamine which contains primarily oligomers higher than hexamine, to produce dispersants that are superior to dispersants made from conventional PAM which contain lower molecular weight amine oligomers.

DETAILED DESCRIPTION OF THE INVENTION

The present invention relates to a derivatization (amidation), using heavy polyamine or heavy polyamine and a second amine, of functionalized hydrocarbon wherein the hydrocarbon is hydrocarbon compound (i.e., hydrocarbon with $\overline{M}_n <500$) or hydrocarbon polymer (i.e., hydrocarbon with $\overline{M}_n \geq 500$). functionalization is by groups of the formula:

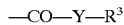
—CO—Y—R³ wherein Y is O or S, and R³ is H, hydrocarbyl or substituted hydrocarbyl and, optionally, at least 50 mole % of the functional groups are attached to a tertiary carbon atom of the polymer backbone (i.e., at least 50 mole % of the functional groups are neo substituted functional groups). R³ is preferably aryl or substituted hydrocarbyl, and more preferably aryl or substituted aryl.

Thus, in one embodiment of the invention, the functionalized hydrocarbon polymer may be depicted by the formula:

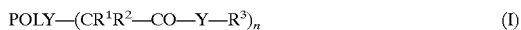
POLY—(CR¹R²—CO—Y—R³)ₙ    (I)

wherein POLY is a backbone derived from a hydrocarbon polymer, n is a number greater than 0. R¹ and R² are independently the same or different and are each H or hydrocarbyl with the proviso that R¹ and R² are selected such that in at least 50 mole % of the —CR¹R²— groups both R¹ and R² are not H (i.e., at least 50 mole % of the —CO—Y—R³ groups are "neo" groups); and R³ is as defined in the preceding paragraph. Similarly, the functionalized hydrocarbon compound may be depicted by replacing POLY in formula (I) with HYDROCARB, denoting a backbone derived from hydrocarbon compound.

As used herein the term "hydrocarbyl" denotes a group having a carbon atom directly attached to the remainder of the molecule and having predominantly hydrocarbon character within the context of this invention and includes polymeric hydrocarbyl radicals. Such radicals include: aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, the two indicated substituents may together form a cyclic radical). Any hydrocarbyl radical containing aromatic is broadly referred to here as "aryl". The hydrocarbyl radicals can contain non-hydrocarbon substituents (e.g., halo, hydroxy, alkoxy, carbalkoxy, nitro, alkylsulfoxy) or hetero groups to the extent they do not alter the predominantly hydrocarbon character of the radical.

In general, no more than about three substituents or hetero atoms, and preferably no more than one, will be present for each 10 carbon atoms in the hydrocarbon-based radical.

Polymeric hydrocarbyl radicals are those derived from hydrocarbon polymers, which may be substituted and/or contain hetero atoms provided that they remain predominantly hydrocarbon in character.

Conversely, as used herein, the term "substituted hydrocarbyl" denotes a radical having a carbon atom directly attached to the remainder of the molecule, wherein the character of the radical is not predominantly hydrocarbon due to the presence of non-hydrocarbon substituents, such as those noted above in describing "hydrocarbyl," or heteroatom groups in the radical. Any substituted hydrocarbyl radical containing aromatic is broadly referred to herein as "substituted aryl."

The functionalized hydrocarbon (i.e., functionalized hydrocarbon compound or functionalized hydrocarbon polymer) may be derived from a hydrocarbon comprising non-aromatic carbon-carbon double bond, also referred to as an olefinically unsaturated bond, or an ethylenic double bond. The hydrocarbon is functionalized at that double bond via a Koch reaction to form the carboxylic acid, carboxylic ester, thio acid, or thio ester.

In the Koch process as practiced herein, a hydrocarbon having at least one ethylenic double bond is contacted with an acid catalyst and carbon monoxide in the presence of a nucleophilic trapping agent such as water or alcohol. The catalyst is preferably a classical Broensted acid or Lewis acid catalyst. These catalysts are distinguishable from the transition metal catalysts of the type described in the prior art. The Koch reaction, as applied to the present invention, may result in good yields of functionalized polymer, even 90 mole % or greater.

POLY, in general formula (I), represents a hydrocarbon polymer backbone. $\overline{M}_n$ may be determined by available techniques such as gel permeation chromatography (GPC). POLY is generally derived from unsaturated polymer.

Hydrocarbons

The hydrocarbons which are useful in the present invention are hydrocarbon compounds and hydrocarbon polymers containing at least one carbon-carbon double bond (olefinic or ethylenic unsaturation). Thus, the maximum number of functional groups per molecule (e.g., per polymer chain) is limited by the number of double bonds per molecule. Such hydrocarbons have been found to be receptive to Koch mechanisms to form carboxylic acids or derivatives thereof, using the catalysts and nucleophilic trapping agents of the present invention.

Useful hydrocarbon polymers in the present invention include polyalkenes including homopolymer, copolymer (used interchangeably with interpolymer) and mixtures. Homopolymers and interpolymers include those derived from polymerizable olefin monomers of 2 to about 16 carbon atoms; usually 2 to about 6 carbon atoms. Particular reference is made to the alpha olefin polymers made using organometallic coordination compounds. A particularly preferred class of polymers are ethylene alpha olefin copolymers such as those disclosed in U.S. Pat. No. 5,017,299. The polymer unsaturation can be terminal, internal or both. Preferred polymers have terminal unsaturation, preferably a high degree of terminal unsaturation. Terminal unsaturation is the unsaturation provided by the last monomer unit located in the polymer. The unsaturation can be located anywhere in this terminal monomer unit. Terminal olefinic groups include vinylidene unsaturation, $R^aR^bC=CH_2$; trisubstituted olefin unsaturation, $R^aR^bC=CR^cH$; vinyl unsaturation. $R^aHC=CH_2$, 1,2-disubstituted terminal unsaturation. $R^aHC=CHR^b$; and tetra-substituted terminal unsaturation, $R^aR^bC=CR^cR^d$. At least one of $R^a$ and $R^b$ is a polymeric group of the present invention, and the remaining $R^b$, $R^c$ and $R^d$ are hydrocarbon groups as defined with respect to $R^1$, $R^2$, and $R^3$ above.

Low molecular weight polymers, also referred to herein as dispersant range molecular weight polymers, are polymers having $\overline{M}_n$ less than 20,000, preferably 500 to 20,000 (e.g. 1,000 to 20,000), more preferably 1,500 to 10,000 (e.g. 2,000 to 8,000) and most preferably from 1,500 to 5,000. The number average molecular weights are measured by vapor phase osmometry. Low molecular weight polymers are useful in forming dispersants for lubricant additives.

Medium molecular weight polymers have $\overline{M}_n$'s ranging from 20,000 to 200,000, preferably 25,000 to 100,000; and more preferably, from 25,000 to 80,000 and are useful for viscosity index improvers for lubricating oil compositions, adhesive coatings, tackifiers and sealants. The medium $\overline{M}_n$ can be determined by membrane osmometry.

The higher molecular weight materials have $\overline{M}_n$ of greater than about 200,000 and can range to 15,000,000 with specific embodiments of 300,000 to 10,000,000 and more specifically 500,000 to 2,000,000. These polymers are useful in polymeric compositions and blends including elastomeric compositions. Higher molecular weight materials having $\overline{M}_n$'s of from 20,000 to 15,000,000 can be measured by gel permeation chromatography with universal calibration, or by light scattering. The values of the ratio $\overline{M}_w/\overline{M}_n$, referred to as molecular weight distribution ("MWD"), are not critical. However, a typical minimum $\overline{M}_w/\overline{M}_n$ value of about 1.1–2.0 is preferred with typical ranges of about 1.1 up to about 4.

The olefin monomers are preferably polymerizable terminal olefins; that is, olefins characterized by the presence in their structure of the group $—R—C=CH_2$, where R is H or a hydrocarbon group. However, polymerizable internal olefin monomers (sometimes referred to in the patent literature as medial olefins) characterized by the presence within their structure of the group:

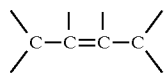

can also be used to form the polyalkenes. When internal olefin monomers are employed, they normally will be employed with terminal olefins to produce polyalkenes which are interpolymers. For this invention, a particular polymerized olefin monomer which can be classified as both a terminal olefin and an internal olefin, will be deemed a terminal olefin. Thus, pentadiene-1,3 (i.e., piperylene) is deemed to be a terminal olefin.

As the term is used herein, "hydrocarbon polymer" includes polymers (e.g., polyalkenes) which contain non-hydrocarbon substituents, such as lower alkoxy (lower=1 to 7 carbon atoms). lower alkyl mercapto, hydroxy, mercapto, and carbonyl, wherein the non-hydrocarbon moieties do not substantially interfere with the functionalization and derivatization reactions of this invention. Such substituents typically constitute not more than about 10 wt. % of the total weight of the hydrocarbon polymer (e.g., polyalkene).

The polyalkenes may include aromatic groups and cycloaliphatic groups such as would be obtained from polymerizable cyclic olefins or cycloaliphatic substituted-polymerizable acrylic olefins. There is a general preference for polyalkenes free from aromatic and cycloaliphatic groups (other than the diene styrene interpolymer exception already noted). There is a further preference for polyalkenes derived from homopolymers and interpolymers of terminal hydrocarbon olefins of 2 to 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. However, another preferred class of polyalkenes are the latter, more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene- 1; etc.; propylene-tetramer; diisobutylene; isobutylene trimer; butadiene-1,2; butadiene-1,3; pentadiene-1,2; pentadiene-1,3; etc. Specific examples of polyalkenes include polypropylenes, polybutenes, ethylene-propylene copolymers, ethylene-butene copolymers using the above-noted nonconjugated dienes, propylene-butene copolymers, styrene-isobutene copolymers, isobutene-butadiene-1,3 copolymers, etc., and terpolymers of isobutene, styrene and piperylene and copolymer of 80% of ethylene and 20% of propylene. A useful source of polyalkenes are the poly (isobutene)s obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride. Also useful are the high molecular weight poly-n-butenes of U.S. Ser. No. 992,871, filed Dec. 17, 1992. A preferred source of monomer for making poly-n-butenes is petroleum feedstreams such as Raffinate II. These feedstocks are disclosed in the art such as in U.S. Pat. No. 4,952,739.

Ethylene Alpha-Olefin Copolymer

Preferred polymers are polymers of ethylene and at least one alpha-olefin having the formula $H_2C=CHR^4$ wherein $R^4$ is straight chain or branched chain alkyl radical comprising 1 to 18 carbon atoms and wherein the polymer contains a high degree of terminal ethenylidene unsaturation. Preferably $R^4$ in the above formula is alkyl of from 1 to 8 carbon atoms and more preferably is alkyl of from 1 to 2 carbon atoms. Therefore, useful comonomers with ethylene in this invention include propylene, 1-butene, hexene-1, octene-1, etc., and mixtures thereof (e.g. mixtures of propylene and 1-butene, and the like). Preferred polymers are copolymers of ethylene and propylene and ethylene and butene-1.

The copolymers include terpolymers which contain units derived from a non-conjugated diene such as dicyclopentadiene, 1,4-hexadiene, and ethylidene norbornene, as well as others as are well known in the art.

The molar ethylene content of the polymers employed is preferably in the range of between about 20 and about 80%, and more preferably between about 30 and about 70%. When butene-1 is employed as comonomer with ethylene, the ethylene content of such copolymer is most preferably between about 20 and about 45 wt %, although higher or lower ethylene contents may be present. The most preferred ethylene-butene-1 copolymers are disclosed in U.S. Ser. No. 992,192, filed Dec. 17, 1992 and incorporated herein by reference in its entirety. The preferred method for making low molecular weight ethylene/α-olefin copolymer is described in U.S. Ser. No. 992,690, filed Dec. 17, 1992.

Preferred ranges of number average molecular weights of polymer for use as precursors for dispersants are from about 500 to 10,000, preferably from about 1,000 to 8,000 (e.g., from about 1,500 to 5,000), most preferably from about 2,500 to 6,000. A convenient method for such determination is by size exclusion chromatography (also known as gel permeation chromatography (GPC)) which additionally provides molecular weight distribution information. Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g.

The preferred ethylene alpha-olefin polymers are further characterized in that up to about 95% and more of the polymer chains possess terminal vinylidene-type unsaturation. Thus, one end of such polymers will be of the formula POLY-C($R^{11}$)=$CH_2$ wherein $R^{11}$ is $C_1$ to $C_{18}$ alkyl, preferably $C_1$ to $C_8$ alkyl, and more preferably methyl or ethyl and wherein POLY represents the polymer chain. A minor amount of the polymer chains can contain terminal ethenyl unsaturation, i.e. POLY-CH=$CH_2$, and a portion of the polymers can contain internal monounsaturation, e.g. POLY-CH=CH($R^{11}$), wherein $R^{11}$ is as defined above.

The preferred ethylene alpha-olefin polymer comprises polymer chains, at least about 30% of which possess terminal vinylidene unsaturation. Preferably at least about 50%, more preferably at least about 60%, and most preferably at least about 75% (e.g. 75 to 98%), of such polymer chains exhibit terminal vinylidene unsaturation. The percentage of polymer chains exhibiting terminal vinylidene unsaturation may be determined by FTIR spectroscopic analysis, titration, HNMR, or C-13 NMR.

Another preferred class of polymers are alpha-olefin polymers, i.e., alpha-olefin homopolymers of an alpha-olefin of formula $H_2C$=$CHR^4$ and alpha-olefin interpolymers of two or more alpha-olefins of formula $H_2C$=$CHR^4$, wherein $R^4$ is as defined above. The preferred alpha-olefin monomers are butene-1 and propylene and preferred alpha-olefin polymers are polypropylene, polybutene-1 and butene-1-propylene copolymer (e.g., butene-1-propylene copolymers having 5 to 40 mole % propylene). Preferred alpha-olefin polymers comprise polymer chains possessing high terminal unsaturation; i.e., at least about 30%, preferably at least about 50%, more preferably at least about 60%, and most preferably at least about 75% (e.g., 75 to 98%) of the chains have terminal vinylidene unsaturation.

The polymers can be prepared by polymerizing monomer mixtures comprising the corresponding monomers (e.g., ethylene with other monomers such as alpha-olefins, preferably from 3 to 4 carbon atoms) in the presence of a metallocene catalyst system comprising at least one metallocene (e.g., a cyclopentadienyl-transition metal compound) and an activator, e.g. alumoxane compound. The comonomer content can be controlled through selection of the metallocene catalyst component and by controlling partial pressure of the monomers.

The polymer for use in the present invention can include block and tapered copolymers derived from monomers comprising at least one conjugated diene with at least monovinyl aromatic monomer, preferably styrene. Such polymers should not be completely hydrogenated so that the polymeric composition contains olefinic double bonds, preferably at least one bond per molecule. The present invention can also include star polymers as disclosed in patents such as U.S. Pat. Nos. 5,070,131; 4,108,945; 3,711,406; and 5,049,294.

Hydrocarbon Compounds

Useful hydrocarbon compounds in the present invention include straight or branched chain mono- and diolefinic hydrocarbons having from about 5 to 36 carbon atoms, and preferably from about 10 to 35 carbon atoms. Suitable monoolefins include alkenes such as dodecene-1, 2-propylnonene-1, tetradecene-1, tetradecene-7, 5,9,13-trimethyltetradecene-1, octadecene-1, octadecene-9, and docosene-1. Suitable diolefins are exemplified by 1,15-hexadecadiene and 2,19-dimethyl-1,19-icosadiene. Oligomers of $C_3$ to $C_{12}$ olefins, preferably $C_3$ to $C_8$ olefins, both alpha-olefins and internal olefins are also useful, such as pentaisobutylene, propylene tetramer, propylene octamer, and 1-decene trimer. Suitable oligomers also include oligomers of butene-1 (e.g., octamers, heptamers, hexamers, pentamers, etc. and mixtures thereof) and co-oligomers of butene-1 with ethylene.

Functionalized Hydrocarbon

The hydrocarbon can be functionalized to contain —CO—Y—$R^3$ groups by any suitable functionalization chemistry, such as by reacting the hydrocarbon with an unsaturated carboxylic compound under thermal "ene" conditions or in the presence of a free radical initiator. The hydrocarbons are preferably functionalized by carbonylation via the Koch reaction as disclosed in U.S. Ser. No 992,403, filed Dec. 17, 1992.

Referring to Formula (I), the letter n is greater than 0 and represents the functionality (F) or average number of functional groups per hydrocarbon chain (i.e., per polymer chain or, where HYDROCARB is substituted for POLY in Formula (I), per molecular chain of hydrocarbon compound). Thus, functionality can be expressed as the average number of moles of functional groups per "mole of hydrocarbon." It is to be understood that the term "mole of hydrocarbon" includes both functionalized and unfunctionalized hydrocarbon, so that although F corresponds to n of Formula (I), the functionalized hydrocarbon will include molecules having no functional groups. Specific preferred embodiments of n include 1>n>0; 2>n>1; and n>2. n can be determined by C-13 NMR. The optimum number of functional groups needed for desired performance will typically increase with number average molecular weight of the hydrocarbon. The maximum value of n will be determined by the number of double bonds per hydrocarbon chain in the unfunctionalized hydrocarbon or polymer.

In specific and preferred embodiments the "leaving group" (—$YR^3$) has a pKa of less than or equal to 12. preferably less than 10, and more preferably less than 8. The pKa is determined from the corresponding acidic species HY—$R^3$ in water at room temperature. Where the leaving group is a simple acid or alkyl ester, the functionalized hydrocarbon is very stable especially as the % neo substitution increases.

The "neo" functionalized hydrocarbons used in the present invention are generally more stable than iso structures. In preferred embodiments the hydrocarbon can be at least 50, preferably at least 60, more preferably at least 80 mole % neofunctionalized. The polymer can be greater than 90, or 99 and even about 100 mole percent neo.

In one preferred composition of the hydrocarbon defined by formula (I), Y is O (oxygen), $R^1$ and $R^2$ can be the same or different and are selected from H, a hydrocarbyl group, and a polymeric group. In another preferred embodiment Y is O or S, $R^1$ and $R^2$ can be the same or different and are selected from H, a hydrocarbyl group, a substituted hydrocarbyl group, and a polymeric group, and $R^3$ is selected from an aromatic group (aryl group) and a substituted hydrocarbyl group, or from an aromatic group (aryl group) and a substituted aromatic group (substituted aryl group). This embodiment is generally more reactive towards derivatization with the heavy amines of the present invention especially where the $R^3$ substituent contains electron withdrawing species. It has been found that in this embodiment, a preferred leaving group, —$YR^3$, has a corresponding acidic species $HYR^3$ with a pKa of less than 12, preferably less than 10 and more preferably 8 or less. pKa values can range typically from 5 to 12, preferably from 6 to 10, and most preferably from 6 to 8. The pKa of the leaving group determines how readily the system will react with derivatizing compounds to produce derivatized product.

In a particularly preferred composition, $R^3$ is represented by the formula:

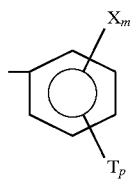

wherein X, which may be the same or different, is an electron withdrawing substituent, T, which may be the same or different, represents a non-electron withdrawing substituent (e.g. electron donating), and m and p are from 0 to 5 with the sum of m and p being from 0 to 5. More preferably, m is from 1 to 5 and preferably 1 to 3. In a particularly preferred embodiment X is selected from a halogen, preferably F or Cl, $CF_3$, cyano groups and nitro groups and p=0. A preferred $R^3$ is derived from 2,4-dichlorophenol.

The composition of the present invention includes the derivatized hydrocarbon which is the reaction product of the Koch functionalized hydrocarbon and the derivatizing compound(s) (e.g., heavy amine). Derivatized hydrocarbon or polymer will typically contain at least an amide. The suitability for a particular end use may be improved by appropriate selection of the molecular weight and functionality used in the derivatized hydrocarbon as discussed hereinafter.

The Koch reaction permits controlled functionalization of unsaturated hydrocarbons (i.e., unsaturated hydrocarbon compounds and polymers). When both carbons of the carbon-carbon double bond are substituted with at least one hydrogen, it will result in an "iso" functional group, i.e. one of $R^1$ or $R^2$ of Formula I is H. When a carbon of the double bond is fully substituted with hydrocarbyl groups it will result in an neo functional group, i.e. both $R^1$ or $R^2$ of Formula I are non-hydrogen groups.

Hydrocarbons produced by processes which result in a terminally unsaturated chain can be functionalized to a relatively high yield in accordance with the Koch reaction of the present invention. It has been found that the neo acid functionalized hydrocarbon (e.g., neo acid functionalized hydrocarbon polymer) can be derivatized to a relatively high yield.

The Koch process also makes use of relatively inexpensive materials i.e., carbon monoxide at relatively low temperatures and pressures. Also, the leaving group compound $HYR^3$ can be removed and recycled upon derivatizing the Koch functionalized hydrocarbon with the heavy amine.

The derivatized hydrocarbons of the present invention are useful as lubricant additives such as dispersants, viscosity improvers, and multifunctional viscosity improvers. The present invention includes oleaginous compositions comprising the above derivatized hydrocarbon. Such compositions include lubricating oil compositions and concentrates.

A process for functionalizing the hydrocarbon comprises the step of catalytically reacting in admixture:
 (a) at least one hydrocarbon;
 (b) carbon monoxide,
 (c) at least one acid catalyst, and
 (d) a nucleophilic trapping agent selected from the group consisting of water, hydroxy-containing compounds and thiol-containing compounds, the reaction being conducted a) in the absence of reliance on transition metal as a catalyst; or b) with at least one acid catalyst having a Hammett acidity of less than −7; or c) wherein functional groups are formed at at least 40 mole % of the ethylenic double bonds; or d) wherein the nucleophilic trapping agent has a pKa of less than 12.

The process relates to a hydrocarbon having at least one ethylenic double bond reacted via a Koch mechanism to form carbonyl or thiol carbonyl group-containing hydrocarbons, which may subsequently be derivatized. The hydrocarbons react with carbon monoxide in the presence of an acid catalyst or a catalyst preferably complexed with the nucleophilic trapping agent. A preferred catalyst is $BF_3$ and preferred catalyst complexes include $BF_3.H_2O$ and $BF_3$ complexed with 2,4-dichlorophenol. The starting hydrocarbon reacts with carbon monoxide at points of unsaturation to form either iso- or neo- acyl groups with the nucleophilic trapping agent, e.g. with water, alcohol (preferably a substituted phenol) or thiol to form respectively a carboxylic acid, carboxylic ester group, or thio ester.

In a preferred process, at least one hydrocarbon having at least one carbon-carbon double bond is contacted with an acid catalyst or catalyst complex having a Hammett Scale acidity value of less than −7, preferably from −8.0 to −11.5 and most preferably from −10 to −11.5. Without wishing to be bound by any particular theory, it is believed that a carbenium ion may form at the site of one of carbon-carbon double bonds. The carbenium ion may then react with carbon monoxide to form an acylium cation. The acylium cation may react with at least one nucleophilic trapping agent as defined herein.

At least 40 mole %, preferably at least 50 mole %, more preferably at least 80 mole %, and most preferably 90 mole % of the double bonds will react to form acyl groups wherein the non-carboxyl portion of the acyl group is determined by the identity of the nucleophilic trapping agent, i.e. water forms acid, alcohol forms acid ester and thiol forms thio ester. The hydrocarbon functionalized by the recited process can be isolated using fluoride salts. The fluoride salt can be selected from the group consisting of ammonium fluoride, and sodium fluoride.

Preferred nucleophilic trapping agents are selected from the group consisting of water, monohydric alcohols, polyhydric alcohols hydroxyl-containing aromatic compounds and hetero substituted phenolic compounds. The catalyst and nucleophilic trapping agent can be added separately or combined to form a catalytic complex.

Following is an example of a reaction sequence for a terminally unsaturated hydrocarbon polymer reacted via the Koch mechanism to form an acid or an ester. The polymer is contacted with carbon monoxide or a suitable carbon monoxide source such as formic acid in the presence of an acidic catalyst. The catalyst contributes a proton to the carbon-carbon double bond to form a carbenium ion. This is followed by addition of CO to form an acylium ion which reacts with the nucleophilic trapping agent. POLY, Y, $R^1$, $R^2$ and $R^3$ are defined as above.

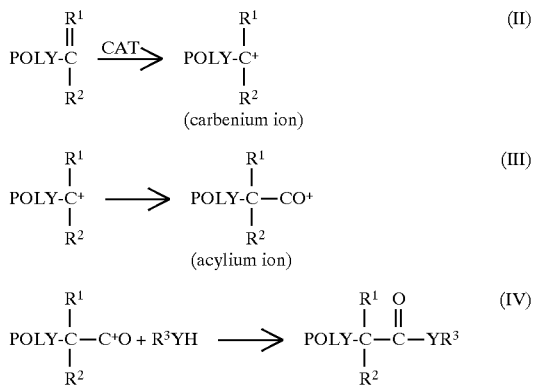

The Koch reaction is particularly useful to functionalize poly(alpha olefins) and ethylene alpha olefin copolymers formed using metallocene-type catalysts. These polymers contain terminal vinylidene groups. There is a tendency for such terminal groups to predominate and result in neo-type (tertiary) carbenium ions. In order for the carbenium ion to form, the acid catalyst is preferably relatively strong. However, the strength of the acid catalyst is preferably balanced against detrimental side reactions which can occur when the acid is too strong.

The Koch catalyst can be employed by preforming a catalyst complex with the proposed nucleophilic trapping agent or by adding the catalyst and trapping agent separately to the reaction mixture. This later embodiment has been found to be a particular advantage since it eliminates the step of making the catalyst complex.

The following are examples of acidic catalyst and catalyst complex materials with their respective Hammett Scale Value acidity: 60% $H_2SO_4$, −4.32; $BF_3.3H_2O$, −4.5; $BF_3.2H_2O$, −7.0; $WO_3/Al_2O_3$, less than −8.2; $SiO_2/Al_2O_3$, less than −8.2; HF, −10.2; $BF_3.H_2O$, −11.4 to −11.94; $ZrO_2$ less than −12.7; $SiO_2/Al_2O_3$, −12.7 to −13.6; $AlC_3$, −13.16 to −13.75; $AlCl_3/CuSO_4$, −13.75 to −14.52.

It has been found that $BF_3.2H_2O$ is ineffective at functionalizing hydrocarbon polymer through a Koch mechanism. In contrast, $BF_3.H_2O$ resulted in high yields of carboxylic acid for the same reaction. The use of $H_2SO_4$ as a catalyst involves control of the acid concentration to achieve the desired Hammett Scale Value range. Preferred catalysts are $H_2SO_4$ and $BF_3$ catalyst systems.

Suitable $BF_3$ catalyst complexes for use in the present invention can be represented by the formula:

wherein R can represent hydrogen, hydrocarbyl (as defined below in connection with R') —CO—R', —$SO_2$—R', —PO—$(OH)_2$, and mixtures thereof wherein R' is hydrocarbyl, typically alkyl, e.g., $C_1$ to $C_{20}$ alkyl, and. e.g., $C_6$ to $C_{14}$ aryl, aralkyl, and alkaryl, and x is less than 2.

Following reaction with CO, the reaction mixture is further reacted with water or another nucleophilic trapping agent such as an alcohol or phenolic, or thiol compound. The use of water releases the catalyst to form an acid. The use of hydroxy trapping agents releases the catalyst to form an ester, the use of a thiol releases the catalyst to form a thiol ester.

Koch product, also referred to herein as functionalized hydrocarbon (i.e., functionalized hydrocarbon polymer or functionalized hydrocarbon compound), is typically derivatized as described hereinafter. Derivatization reactions involving ester functionalized hydrocarbon will typically have to displace the alcohol-derived moiety therefrom. Consequently, the alcohol-derived portion of the Koch functionalized hydrocarbon is sometimes referred to herein as a leaving group. The ease with which a leaving group is displaced during derivatization will depend on its acidity, i.e. the higher the acidity the more easily it will be displaced. The acidity in turn of the alcohol is expressed in terms of its pKa (in water at 25° C.).

Preferred nucleophilic trapping agents include water and hydroxy group containing compounds. Useful hydroxy trapping agents include aliphatic compounds such as monohydric and polyhydric alcohols or aromatic compounds such as phenols and naphthols. The aromatic hydroxy compounds from which the esters of this invention may be derived are illustrated by the following specific examples: phenol, -naphthol, cresol, resorcinol, catechol, 2-chlorophenol, 2-chlorocresol and 2,4-dichlorophenol, and other cresols and chlorophenols.

The alcohols preferably can contain up to about 40 aliphatic carbon atoms. They may be monohydric alcohols such as methanols, ethanol, benzyl alcohol, 2-methylcyclohexanol, beta-chloroethanol, monomethyl ether of ethylene glycol, etc. The polyhydric alcohols preferably contain from 2 to about 5 hydroxy radicals, e.g., ethylene glycol, diethylene glycol. Other useful polyhydric alcohols include glycerol, monomethyl ether of glycerol, and pentaerythritol. Useful unsaturated alcohols include allyl alcohol, and propargyl alcohol.

Particularly preferred alcohols include those having the formula $R^*_2CHOH$ where an $R^*$ is independently hydrogen, an alkyl, aryl, hydroxyalkyl, or cycloalkyl. Specific alcohols include alkanols such as methanol, ethanol, etc. Also preferred useful alcohols include aromatic alcohols, phenolic compounds and polyhydric alcohols as well as monohydric alcohols such as 1,4-butanediol.

It has been found that neo-acid ester functionalized hydrocarbon or polymer is extremely stable due, it is believed, to steric hindrance. Consequently, the yield of derivatized hydrocarbon or polymer obtainable therefrom will vary depending on the ease with which a derivatizing compound can displace the leaving group of the functionalized hydrocarbon or polymer.

The yield of derivatized hydrocarbon can be significantly enhanced by controlling the acidity of the leaving group, e.g., the alcohol derived portion of the ester functionalized polymer. Thus, while any acidity which is effective to enable the leaving group —$YR^3$ of Formula (I) to be displaced during derivatization can be employed, it is contemplated that such effective acidities, expressed as the pKa of the compound $HYR^3$ in water at 25° C., be typically not greater than about 12, preferably not greater than about 10, and most preferably not greater than about 8, which pKa values can range typically from about 5 to about 12, preferably from about 6 to about 10, and most preferably from about 6 to about 8.

While the functionalized hydrocarbons themselves possess some dispersant characteristics and can be used as dispersant additives in lubricants and fuels, best results are achieved when a substantial proportion of the functional groups are derivatized, in other words when at least about 80, preferably at least about 90, most preferably at least about 95%, for example, greater than about 98% and ideally greater than about 99%, of the functional groups are derivatized. Furthermore, it is not necessary that all the functional groups of the functionalized hydrocarbon be derivatized to the same product or even the same type of product. Thus, functionalized hydrocarbon may be first reacted with one or more alcohols to convert a portion of acid functional groups to ester groups and thereafter this ester product can be reacted with one or more amines and/or one or more metal reactants to convert all or a portion of the remaining carboxyl functions to a derivatized amine group such as amides, imides, amidines, amine salt groups, and the like or metal salt groups.

The most preferred alcohol trapping agents may be obtained by substituting a phenol with at least one electron withdrawing substituent such that the substituted phenol possesses a pKa within the above described preferred pKa ranges. In addition, phenol may also be substituted with at least one non-electron withdrawing substituent (e.g., electron donating), preferably at positions meta to the electron withdrawing substituent to block undesired alkylation of the phenol by the polymer during the Koch reaction. This further improves yield to desired ester functionalized hydrocarbon or polymer.

Accordingly, and in view of the above, the most preferred trapping agents are phenolic and substituted phenolic compounds represented by the formula:

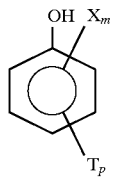
(V)

wherein X, which may be the same or different, is an electron withdrawing substituent, and T which may be the same or different is a non-electron withdrawing group; m and p are from 0 to 5 with the sum of m and p being from 0 to 5, and m is preferably from 1 to 5, and more preferably, m is 1 or 2. X is preferably a group selected from halogen, cyano, and nitro, preferably located at the 2- and/or 4-position, and T is a group selected from hydrocarbyl, and hydroxy groups and p is 1 or 2 with T preferably being located at the 4 and/or 6 position. More preferably X is selected from Cl, F, Br, cyano or nitro groups and m is preferably from 1 to 5, more preferably from 1 to 3, yet more preferably 1 to 2, and most preferably 2 located at the 2 and 4 locations relative to —OH.

The relative amounts of reactants and catalyst, and the conditions controlled in a manner sufficient to functionalize typically at least about 40, preferably at least about 80, more preferably at least about 90 and most preferably at least about 95 mole % of the carbon-carbon double bonds initially present in the unfunctionalized hydrocarbon.

The amount of $H_2O$, alcohol, or thiol used is preferably at least the stoichiometric amount required to react with the acylium cations. It is preferred to use an excess of alcohol over the stoichiometric amount. The alcohol performs the dual role of reactant and diluent for the reaction. However, the amount of the alcohol or water used should be sufficient to provide the desired yield yet at the same time not dilute the acid catalyst so as to adversely affect the Hammett Scale Value acidity.

The hydrocarbon added to the reactant system is typically in a liquid phase. Optionally, the hydrocarbon can be dissolved in an inert solvent. The yield can be determined upon completion of the reaction by separating molecules which contain acyl groups which are polar and hence can easily be separated from unreacted non-polar compounds. Separation can be performed using absorption techniques which are known in the art. The amount of initial carbon-carbon double bonds and carbon-carbon double bonds remaining after the reaction can be determined by C-13 NMR techniques.

In accordance with the process, the hydrocarbon is heated to a desired temperature range which is typically between –20° C. to 200° C., preferably from 0C to 80° C. and more preferably from 40° C. to 65° C. Temperature can be controlled by heating and cooling means applied to the reactor. Since the reaction is exothermic usually cooling means are required. Mixing is conducted throughout the reaction to assure a uniform reaction medium. The reaction can be carried out in a batch reactor or, preferably, in a continuous reactor, e.g., a continuous stirred tank reactor (CSTR), or most preferably a tubular reactor.

The catalyst (and nucleophilic trapping agent) can be prereacted to form a catalyst complex or are charged separately in one step to the reactor to form the catalyst complex in situ at a desired temperature and pressure, preferably under nitrogen. In a preferred system the nucleophilic trapping agent is a substituted phenol used in combination with $BF_3$. The reactor contents are continuously mixed and then rapidly brought to a desired operating pressure using a high pressure carbon monoxide source. Useful pressures can be up to 138000 kPa (20,000 psig), and typically will be at least 2070 kPa (300 psig), preferably at least 5520 kPa (800 psig), and most preferably at least 6900 kPa (1,000 psig), and typically will range from 3450 to 34500 kPa (500 to 5,000 psig) preferably from 4485 to 20700 kPa (650 to 3,000 psig) and most preferably from 4485 to 13800 kPa (650 to 2000 psig). The carbon monoxide pressure may be reduced by adding a catalyst such as a copper compound. The catalyst to polymer volume ratio can range from 0.25 to 4, preferably 0 5 to 2 and most preferably 0.75 to 1.3.

Preferably, the hydrocarbon, catalyst, nucleophilic trapping agent and CO are fed to the reactor in a single step. The reactor contents are then held for a desired amount of time under the pressure of the carbon monoxide. The reaction time can range up to 5 hours and typically 0.7 to 4 and more typically from 0.5 to 2 hours. The reactor contents can then be discharged and the product, which is a Koch functionalized hydrocarbon or polymer comprising either a carboxylic acid or carboxylic ester or thiol ester functional groups separated. Upon discharge, any unreacted CO can be vented off. CO can be used to flush the reactor and the vessel to receive the polymer.

Depending on the particular reactants employed, the functionalized hydrocarbon containing reaction mixture may be a single phase, a combination of a partitionable hydrocarbon or polymer and acid phase or an emulsion with either the hydrocarbon or polymer phase or acid phase being the continuous phase. Upon completion of the reaction, the hydrocarbon is recovered by suitable means.

When the mixture is an emulsion, a suitable means can be used to separate the hydrocarbon. A preferred means for separating hydrocarbon polymer is the use of fluoride salts, such as sodium or ammonium fluoride in combination with an alcohol such as butanol or methanol to neutralize the catalyst and phase separate the reaction complex. The fluoride ion helps trap the $BF_3$ complexed to the functionalized polymer and helps break emulsions generated when the crude product is washed with water. Alcohols such as methanol and butanol and commercial demulsifiers also help to break emulsions especially in combination with fluoride ions. Preferably, nucleophilic trapping agent is combined with the fluoride salt and alcohols when used to separate polymers. The presence of the nucleophilic trapping agent as a solvent minimizes transesterification of the functionalized polymer.

Where the nucleophilic trapping agent has a pKa of less than 12 the functionalized hydrocarbon can be separated from the nucleophilic trapping agent and catalyst by depressurization and distillation. It has been found that where the nucleophilic trapping agent has lower pKa's, the catalyst, i.e. $BF_3$ releases more easily from the reaction mixture.

As indicated above, hydrocarbon which has undergone the Koch reaction is also referred to herein as functionalized hydrocarbon. Thus, a functionalized hydrocarbon comprises molecules which have been chemically modified by at least one functional group so that the functionalized hydrocarbon is (a) capable of undergoing further chemical reaction (e.g. derivatization) or (b) has desirable properties, not otherwise possessed by the hydrocarbon alone, absent such chemical modification.

It will be observed from the discussion of formula I that the functional group is characterized as being represented by the parenthetical expression

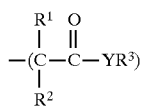

which expression contains the acyl group —CO—$YR^3$. It will be understood that while the —$CR^1R^2$— moiety is not added to the hydrocarbon in the sense of being derived from a separate reactant it is still referred to as being part of the functional group for ease of discussion and description. Strictly speaking, it is the acyl group which constitutes the functional group, since it is this group which is added during chemical modification. Moreover, $R'^1$ and $R^2$ represent groups originally present on, or constituting part of, the 2 carbons bridging the double bond before functionalization. However, R' and $R^2$ were included within the parenthetical so that neo acyl groups could be differentiated from iso acyl groups in the formula depending on the identity of R' and $R^2$.

Typically, where the end use of the hydrocarbon is for making dispersant, e.g. as derivatized hydrocarbon, the hydrocarbon is typically a hydrocarbon polymer possessing dispersant range molecular weights ($\overline{M}_n$) and the functionality will typically be significantly lower than for hydrocarbon intended for making derivatized multifunctional V.I. improvers, where the hydrocarbon polymer will possess viscosity modifier range molecular weights ($\overline{M}_n$) as defined hereinafter.

Accordingly, while any effective functionality can be imparted to functionalized hydrocarbon intended for subsequent derivatization, expressed as F, for dispersant end uses, are typically not greater than about 3, preferably not greater than about 2, and typically can range from about 0.5 to about 3, preferably from 0.8 to about 2.0 (e.g. 0.8 to 1).

Similarly, effective functionalities F for viscosity modifier end uses of derivatized hydrocarbon are contemplated to be typically greater than about 3, preferably greater than about 5, and typically will range from 5 to about 10. End uses involving very high molecular weight hydrocarbon polymers contemplate functionalities which can range typically greater than about 20, preferably greater than about 30, and most preferably greater than about 40, and typically can range from 20 to 60, preferably from 25 to 55 and most preferably from 30 to 50.

Derivatization By Heavy Polyamines

The functionalized hydrocarbon is reacted (derivatized) with a heavy polyamine to obtain a derivatized product containing amide groups (i.e. heavy amide groups).

The heavy polyamine contains >28% N, more preferably >30% N. e.g. >32% N, and an equivalent weight of primary amine groups of between 120–160 g/eq, more preferably 120–150 g/eq, e.g. 125–140 g/eq. Best results are obtained when the polyamines contain more than 6 nitrogen atoms per molecule on the average (more preferably >7 e.g. >8 nitrogen atoms per molecule), and more than two primary nitrogens per molecule on the average (preferably >2.2, e.g. >2.4). The ideal spacings between the nitrogens are $C_2$–$C_3$ with $C_3$ preferred at the terminal ends of the polyamine.

Polyamines with these characteristics are commercially available and can be produced by distilling out the tetraethylenepentamine and most of the pentaethylenehexamine fractions from standard polyethyleneamine fractions from standard polyethyleneamine mixtures. Alternatively, they could by synthesized by cyanoethylation of the primary amine groups of polyethylene or polypropylene pentamines or hexamines followed by hydrogenation.

In the process of the invention, the reaction between the functionalized hydrocarbon containing functional groups (i.e., substituted alkyl ester functional groups and/or aryl ester functional groups) and the heavy polyamine is carried out for a time and under conditions sufficient to form amide groups on the functionalized hydrocarbon with the concomitant release of hydroxy compound. Typically, a major portion, more typically at least about 80%, and preferably at least about 90% (e.g., 95 to 100%) of the ester groups are converted to amide groups (i.e., heavy amide groups) in the derivatized product.

The reaction of the heavy polyamine and the functionalized hydrocarbon polymer is typically carried at a temperature in the range of from about 140° to 260° C., preferably from about 180°to 240°, and most preferably from about 200° to 240° (e.g., 210° to 230° C.).

The reaction time will vary depending upon the temperature and the proportion of the functional groups to be derivatized but typically is in the range of about from 1 to 64 hours, wherein longer reaction times are typically required for lower reaction temperatures.

Generally, the amine employed in the reaction mixture is chosen to provide at least an equal number of equivalents of primary amine per equivalent of ester groups in the functionalized hydrocarbon polymer. More particularly, the total amount of amine charged to the mixture typically contains about 1 to 10, preferably about 1 to 6, more preferably about 1.1 to 2, and most preferably about 1.1 to 1.5 (e.g., 1.2 to 1.4) equivalents of primary amine per equivalent of ester groups. The excess of primary amine groups is intended to assure substantially complete conversion of the ester groups to amides.

Solvents which are inert to the reactants and to the resulting derivatized product (e.g., mineral oil) may be employed. However, use of a solvent is typically not preferred, in order to avoid separating the solvent in a post-reaction step.

The reaction may be conducted at any suitable pressure from a partial vacuum to a pressure at or above atmospheric pressure.

In one embodiment, the reaction may be conducted with concurrent selective removal of the leaving group compound (i.e., the $HYR^3$ compound released by formation of the amide) in the manner disclosed in U.S. Ser. No. 261,507 (filed Jun. 17. 1994), and incorporated herein by reference. Concurrent removal of certain leaving group compounds (e.g., 2,4-dichlorophenol) has been found to shorten reaction time necessary to achieve a given level of conversion. Concurrent selective removal of the leaving group can be done, for example, by stripping with an inert gas (e.g., nitrogen) with or without partial vacuum or by distillation with or without a partial vacuum. The low volatility of the heavy polyamine composition are particularly suited for this latter process.

Novel dispersants of the present invention are based on the hydrocarbon, α-olefin polymers, and ethylene/α-olefin polymers as disclosed in U.S. Ser. No. 992,192, filed Dec. 17, 1992, and incorporated herein by reference. Hydrocarbons can be functionalized via "ene" reaction, phenol alkylation, or carbonylation via the Koch reaction. The Koch reaction is disclosed in U.S. Ser. No. 992,403, filed Dec. 17, 1992, and is incorporated herein by reference.

It has been found that the amine segment of the dispersant is very critical both to product performance of neo-amide dispersants and to the amination process of hindered phenyl esters. Typical disclosures of polyamine reactants for the preparation of lubricant dispersants teach a range of nitrogens per molecule of from 1–12. a variety of spacing groups between the nitrogens, and a range of substitution patterns on the amine groups. We have discovered that the hydrocarbyl amides derived from the preferred compositions described below exhibit surprisingly enhanced dispersancy and/or viscometric properties relative to the prior art.

Specifically, one embodiment of this invention comprises oil-soluble derivatized compositions of $C_2$–$C_{18}$ α-olefin polymers or copolymers, functionalized with neo-acid/ester groups.

Preferred polymer compositions are those derived from olefins of structure $RHC=CH_2$ where R is H or a hydrocarbon substituent containing from $C_1$ to $C_{16}$ with at least 30% of the olefin moieties comprising vinylidene groups.

As the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance. The novel preferred compositions allow the benefit of the higher hydrodynamic volumes of high molecular weight dispersant backbones to be realized without the debit of limited nitrogen content in the polar group. Thus, these compositions are especially valuable as the degree of polymerization of the backbone increases above 25 (especially above 40, e.g. above 50).

Conversion of olefin polymers to neo-acids and esters is described in U.S. Ser. No. 992,403, filed Dec. 17, 1992. Derivatizations to neoamides can be carried out under standard conditions at temperatures of 150°–220° C. as described in U.S. Ser. No. 992,403. An alternative method is to carry out the reaction to 95+% yield, and then add a volatile amine such as dimethylaminopropylamine in excess to complete the reaction. The excess amine is then removed by distillation. This process has the advantage of reducing the overall cycle time because second order reactions slow down considerably at the tail end of the reaction unless one of the reactants is present in excess. The small amount of ester (5%) not converted to a high nitrogen dispersant can often be neglected.

Derivatization by a Heavy Polyamine and a Second Amine

Another class of dispersants may be made according to the invention by reacting the Koch-functionalized or otherwise functionalized polymers (e.g. by thermal ene chemistry) with both a heavy polyamine as described and a second amine, which is a more conventional monoamine or polyamine. This results in a dispersant of modified performance as needed according to its application in a lubricant or fuel. Disclosures of other amines suitable for the invention may be found in U.S. Ser. No. 992,403, which is incorporated herein by reference in its entirety for all purposes.

The functionalized hydrocarbon polymer can be reacted with the heavy polyamine and the second amine concurrently or sequentially in either order. In a preferred embodiment the functionalized polymer is reacted with a mixture of a heavy polyamine and a second amine (e.g., a mixture comprising 10 to 90 wt. % heavy polyamine). The reaction conditions described above for reacting heavy polyamine can be employed for reacting a mixture of heavy polyamine and a second amine and for reacting the second amine in a discrete step either before or after reaction with a heavy polyamine.

The total amount of amine (i.e., heavy polyamine and second amine) charged to the mixture is generally at least 1 equivalent, and typically 1 to 10 equivalents (e.g., 1.1 to 2 equivalents), of primary amine per equivalent of functional groups.

The conventional polyamine may be a diamine or higher amine, with 2–6 nitrogens ($N_2$–$N_6$). Included in this group are ethylene diamine, propylene diamine, diethylene triamine, triethylene tetraamine, tetraethylene pentamine, pentaethylene hexamine, dimethylaminopropyl amine, dipropylene triamine, tripropylene tetraamine and the like, as well as higher polyalkylene polyamines and mixed alkylene polyamines. Also usable are the polyoxyalkylene polyamines. Various cyclic and mixed cyclic/acyclic mono- and polyamines may also be used as the amine, such as piperazine and various piperazinyl polyamines. Still other amines include those so-called "one-armed" amines having a single primary amine as disclosed in U.S. Ser. No. 201,534 filed 17 Jun. 1994, incorporated herein by reference in its entirety for all purposes.

The use of a second amine with the heavy polyamine according to the invention permits moderation of the strong amine effect of such dispersants with respect to rubber seals embrittlement, especially for viston fluoroelastomers.

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The derivatized hydrocarbon compositions of the present invention, can be used as ashless dispersants and multifunctional viscosity index improvers in lubricant and fuel compositions.

Post Treatment

The derivatized hydrocarbons may be post-treated (e.g., borated). U.S. Ser. No. 992,403 discloses processes for post treatment and is incorporated herein by reference in its entirety for all purposes.

Lubricating Compositions

The additives of the invention may be used by incorporation into an oleaginous material such as fuels and lubricating oils. U.S. Ser. No. 992,403, filed Dec. 17, 1992, is incorporated herein by reference for its disclosure of fuel and lubricating oil compositions and concentrates containing additives derived from functionalized polymers, and methods for preparing the compositions and concentrates. The compositions and concentrates therein described are applicable herein by substituting the additives of the present invention for the additives of U.S. Ser. No. 992,403. In particular, the present invention includes a fuel composition comprising a fuel and from about 0.001 to 0.5 wt. % of the additive of the invention, and a lubricating oil composition comprising a major amount of base oil and a minor amount, preferably from about 0.1 to 10 wt. %, of the additive of the invention.

The additives of this invention can also be used in lubricants for two-cycle (two-stroke) internal combustion engines. Such engines include rotary engines (e.g., of the Wankel type) as well as those found in power lawn mowers and other power operated garden equipment, power chain saws, pumps, electrical generators, marine outboard engines, snowmobiles, motorcycles, and the like (see, e.g., U.S. Pat. Nos. 4,708,809; 4,740,321; and 5,221,491; the disclosures of which are incorporated herein by reference). These additives may also be used in marine diesel two stroke engines such as are disclosed in U.S. Pat. Nos. 4,283,294 and GB-A-1353034, the disclosures of which are incorporated herein by reference.

In some two-cycle engines the lubricating oil can be directly injected into the combustion chamber along with the fuel or injected into the fuel just prior to the time the fuel enters the combustion chamber. In other types of engines, the fuel and oil can be injected into the combustion chamber separately. As is well known to those skilled in the art, two-cycle engine lubricating oils are often added directly to the fuel to form a mixture of oil and fuel which is then introduced into the engine. Such lubricant-fuel blends contain per one (1) part of oil about 15 to 250 parts of fuel, typically about one (1) part oil to about 50 to 100 parts of fuel. For lubricant additive compositions utilizing hydrocarbon polymers, a polymer $\overline{M}_n$ of about 500 to 1500 is preferred. For additives based on hydrocarbon compounds, a molecular weight or $\overline{M}_n$ of about 200 to 500 is preferred.

The fuels useful in two-cycle engines are well known to those skilled in the art and usually contain a major portion of a normally liquid fuel such as hydrocarbonaceous petroleum distillate fuel (e.g., motor gasoline as defined by ASTM Specification D-439-73). Such fuels can also contain nonhydrocarbonaceous materials such as alcohols, ethers, organonitro compounds and the like (e.g., methanol, ethanol, diethyl ether, methyl ethyl ether, nitromethane) which are also within the scope of this invention as are liquid fuels derived from vegetable or mineral sources such as corn, alfalfa, shale and coal. Examples of such fuel mixtures are combinations of gasoline and ethanol, diesel fuel and ether, gasoline and nitromethane, etc. Where gasoline is used, it is preferred that a mixture of hydrocarbons having an ASTM boiling point of 60° C. at the 10% distillation point to about 205° C. at the 90% distillation point.

The present invention will be further understood by the following examples which include preferred embodiments. In the following examples $\overline{M}_n$ and the ethylene content of the polymers were determined by carbon-13 NMR.

EXAMPLES

The following examples are representative of hydrocarbons functionalized via the Koch reaction and derivatized using heavy polyamine (HA-2).

Comparative Example

An ethylene/butene copolymer (46% ethylene, $\overline{M}_n$=3300) prepared via Ziegler-Natta polymerization with zirconium metallocene catalyst and methyl alumoxane cocatalyst according to known procedures was carbonylated with carbon monoxide in the present of $BF_3$ and 2,4-dichlorophenol in a continuous stirred tank reactor at 50° C. The resulting ester was aninated with a prior art polyamine of 34.3% N and an equivalent weight of primary amine of 111 using a stoichiometry of 1.2 equivalents of primary amine per equivalent of ester by heating for 14–20 hours at 150°–230° C. under reflux and then removing the phenol given off by distillation. The product was diluted with base oil and borated using 7.9 parts of a 30% boric acid slurry in base oil, 118.6 parts of aminated polymer and 98 parts of base oil at 150° C. for 1–2 hours. After filtration, the product contained 0.52% N and 0.18% B.

Example 1

Another dispersant was prepared from the same functionalized polymer described in the Comparative Example by reacting with a polyamine of the present invention having 32.4% N and an equivalent weight of primary amine of 129 using a stoichiometry of 1.2 equivalents of primary amine per equivalent of ester. The amine was added to the ester at 220° C. over a period of three hours and the reaction mixture was soaked for three hours at 220° C. Excess dimethylaminopropylamine (1.5 equivalent per equivalent of original ester) was then added and the reaction mixture was soaked for a further three hours and then stripped to remove the excess amine. The product was diluted with base oil, and borated as above with 11.2 parts of a 30% boric acid slurry per 140 parts of aminated polymer and 110.4 parts of base oil to give a product containing 0.57% N and 0.26% B after filtration.

Example 2

Another dispersant was prepared from an ethylene/butene copolymer (35% ethylene, $\overline{M}_n$=4000) which was carbonylated to a dichlorophenyl ester in a batch reactor. Amination was performed with a polyamine of the present invention of 32.8% N and equivalent weight of primary amine of 131 using a stoichiometry of 1.4 equivalents of primary amine per equivalent of ester 300° C. for 8 hours at a pressure of 2–4 mm removing the phenol as it formed. Last traces of phenol were distilled by stripping for an additional hour with nitrogen at 200° C. at atmospheric pressure. The product was diluted and borated using 1.33 parts of a 30% boric acid slurry in base oil, 16.4 parts of aminated polymer and 13.5 parts of base oil as above yielding a product containing 0.72% N and 0.21% B.

Example 3

A dispersant was prepared from an ethylene/butylene copolymer (51% ethylene, $\overline{M}_n$=5500) which was carbonylated to a dichlorophenyl ester as in Example 2. Amination was performed with the same polyamine and stoichiometry as Example 2 at 200° C. for 12 hours at a pressure of 2–4 mm. After stripping residual phenol for an additional hour with nitrogen, the product was diluted with 1.1 parts of base oil per part of aminated polymer and filtered to give a product with 0.48% N.

Two 5W30 oils were formulated incorporating the dispersants of the Comparative Example and Example 1 along with the detergents, antioxidants, anti-wear agents, etc. typically used in a passenger car motor oil. The same additive components and treat rates of active ingredient were used in each case except that in Comparative Oil A the dispersant of the Comparative Example was used and in Oil B the dispersant of Example 1 was used. The dispersant in Oil B was also blended at a reduced concentration relative to that of Comparative Oil A (95%). The kinematic viscosities at 100° C. and the cold cranking simulator (ccs) viscosities at −25° C. were then adjusted to equivalent values by adjusting the amount of ethylene propylene viscosity modifier and base stock used. Despite the fact that Oil B contained less active dispersant than Comparative Oil A, it required less viscosity modifier (92%) to reach the same kinematic viscosity target.

Comparative Oil A and Oil B were compared in the standard ASTM sequence V-E engine test, an industry measure of dispersant performance. Oil B, despite having less dispersant, equaled or exceeded the performance of Comparative Oil A in every category related to dispersant performance:

| Oil | Average Sludge | PSV | Average Varnish |
|-----|----------------|-----|-----------------|
| A   | 9.0            | 6.7 | 5.8             |
| B   | 9.0            | 7.2 | 6.1             |

Average sludge, piston skirt varnish (PSV) and average varnish are merit ratings with the larger numbers being better.

Table 1 shows results of three samples of an experimental dispersant derived from heavy polyamine in a typical SAE 10W30 lubricant oil formulation using Exxon basestocks. When compared to a reference oil the formulation tested consistently showed a marked improvement in both sludge and varnish performance as measured in the ASTM Sequence V-E engine test. The results demonstrated improved performance at equal or reduced treat rates from the reference, which used a dispersant made with conventional commercial polyamine. Using the experimental dispersant the viscosity modifier treat rate as required to meet SAE 10W30 viscometric targets was also reduced.

Example 4

A linear $C_{18}$ terminally substituted olefin was carbonylated to give a 2,4-dichlorophenyl ester using the general carbonylation procedure of Example 2 above at 60° C. and 10,350 kPa (1500 psi) with 39% dichlorophenol (DCP) and a 2:1 molar ratio of $BF_3$:DCP. The yield was about 71%. The ester may be converted to a heavy polyamine dispersant as shown above.

Example 5

A dispersant is prepared as in Example 1 except that 50% by weight of the heavy polyamine is replaced with tetraethylene pentamine (TEPA). The resulting borated dispersant has the same boron content but less nitrogen and is an effective motor oil dispersant.

TABLE 1

SAE 10W30 LUBRICATING OIL USING EXXON BASESTOCKS

| Dispersant Type | Comparative Reference | Sample A Experimental with Heavy Polyamine | Sample B Experimental with Heavy Polyamine |
|---|---|---|---|
| Dispersant Treat Rate (Relative) | 100 | 100 | 80 |
| V-E Engine Test Results | | | |
| Avg. Sludge | 9.07 | 9.43 | 9.47 |
| Avg. Varnish | 5.12 | 6.74 | 6.75 |
| Piston Skirt Varnish | 6.68 | 6.95 | 6.68 |
| Viscosity Modifier Required Mass % | 6.0 | 2.0 | 1.5 |
| Kinematic Viscosity @ 100° C. | 10.45 | 10.39 | 10.60 |
| Cold Cranking Simulator (CCS) @ −20° C. | 3249 | 3276 | 3262 |

What is claimed is:

1. A process for producing an amide-containing product which comprises the steps of first derivatizing a functionalized hydrocarbon having functional groups of the formula —CO—Y—$R^3$, wherein Y is O or S, and $R^3$ is H, hydrocarbyl, or substituted hydrocarbyl, with a heavy polyamine comprising a mixture of $N_6$–$N_{12}$ polyamines containing less than about 1 wt. % pentamines and lower polyamines and less than about 25 wt. % hexamines, said mixture having an average of 7 or more nitrogens per molecule and an equivalent weight of about 120–160 grams per equivalent of primary amine until a major portion of said functional groups are converted to amide groups and subsequently reacted with a second amine comprising an $N_2$–$N_4$ polyamine and further comprising the step of preparing the functionalized hydrocarbon by reacting in the presence of at least one acid catalyst having a Hammett acidity of less than −7, at least one hydrocarbon having at least one carbon-carbon double bond, carbon monoxide and a nucleophilic trapping agent selected from the group consisting of water, hydroxy-containing compounds and thiol-containing compounds, the reaction being conducted in the absence of reliance on transition metal as catalyst.

2. The process of claim 1 wherein said trapping agent has a pKa of less than 12.

* * * * *